Dec. 11, 1962 G. B. FOX 3,067,757
POWER SCRAPPER FOR DISHWASHING MACHINES
Filed April 26, 1961 3 Sheets-Sheet 1
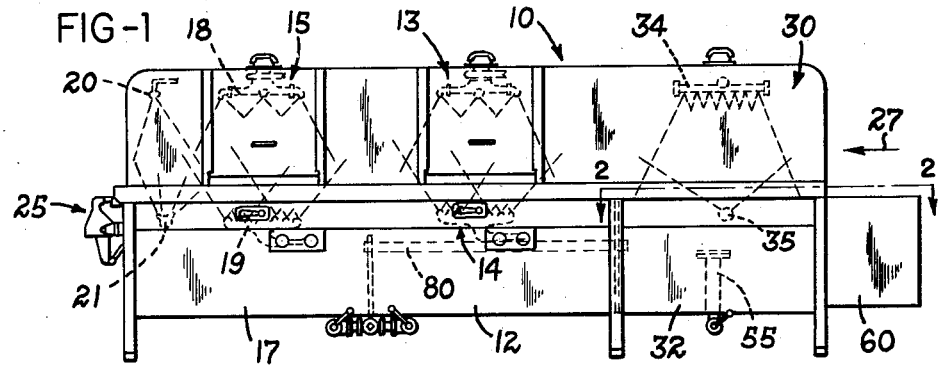
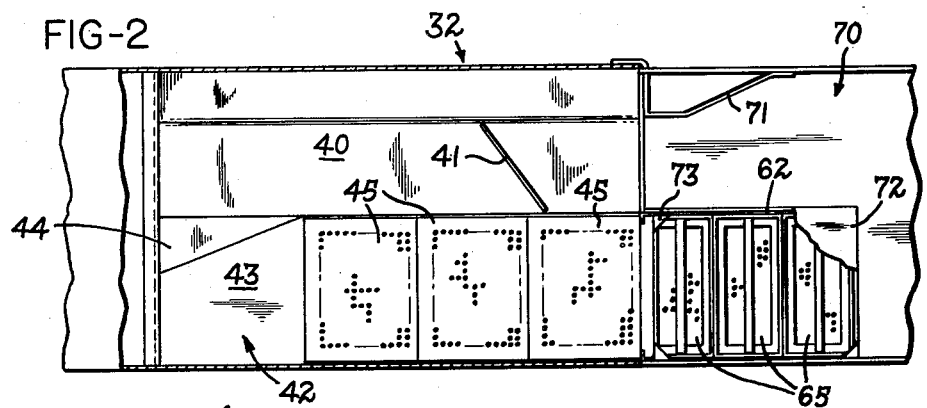
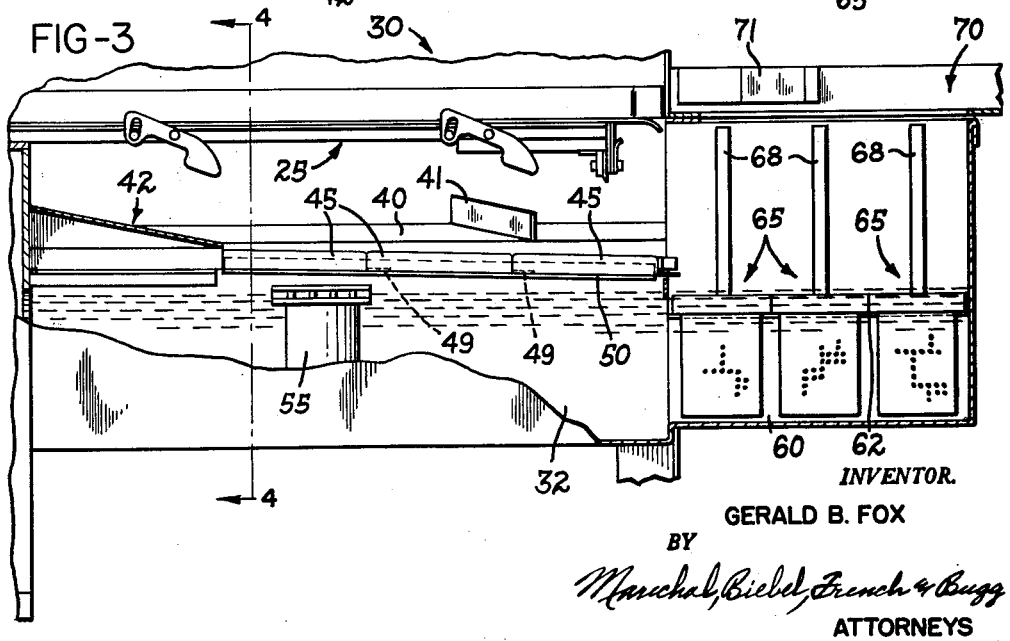
INVENTOR.
GERALD B. FOX
BY
Marchal, Biebel, French & Bugg
ATTORNEYS

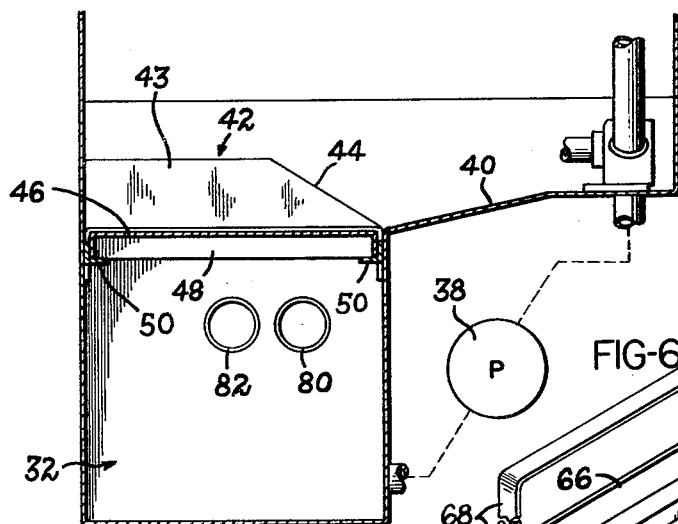
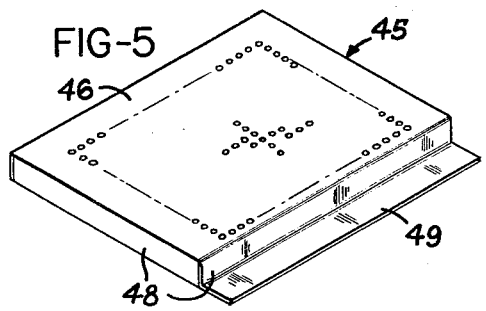
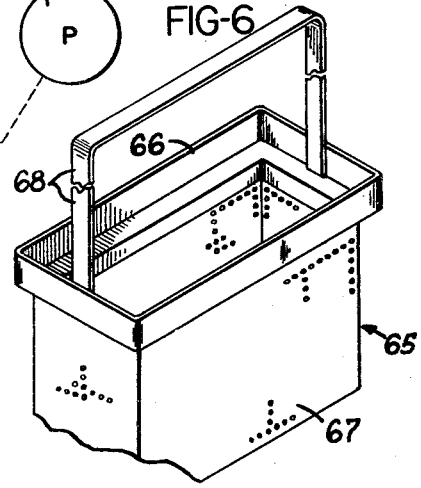
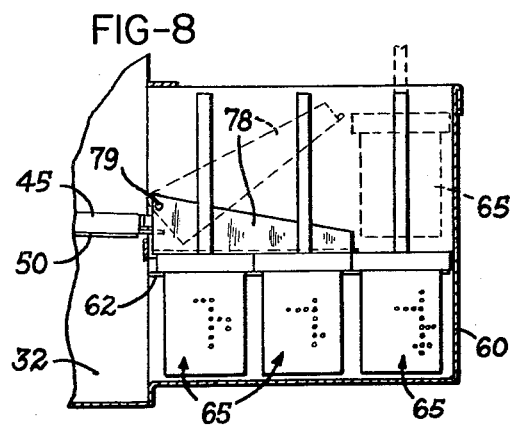
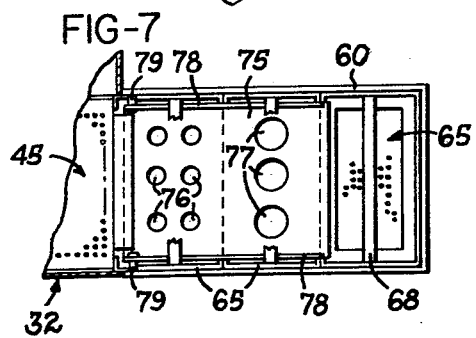

Dec. 11, 1962  G. B. FOX  3,067,757
POWER SCRAPPER FOR DISHWASHING MACHINES
Filed April 26, 1961  3 Sheets-Sheet 3
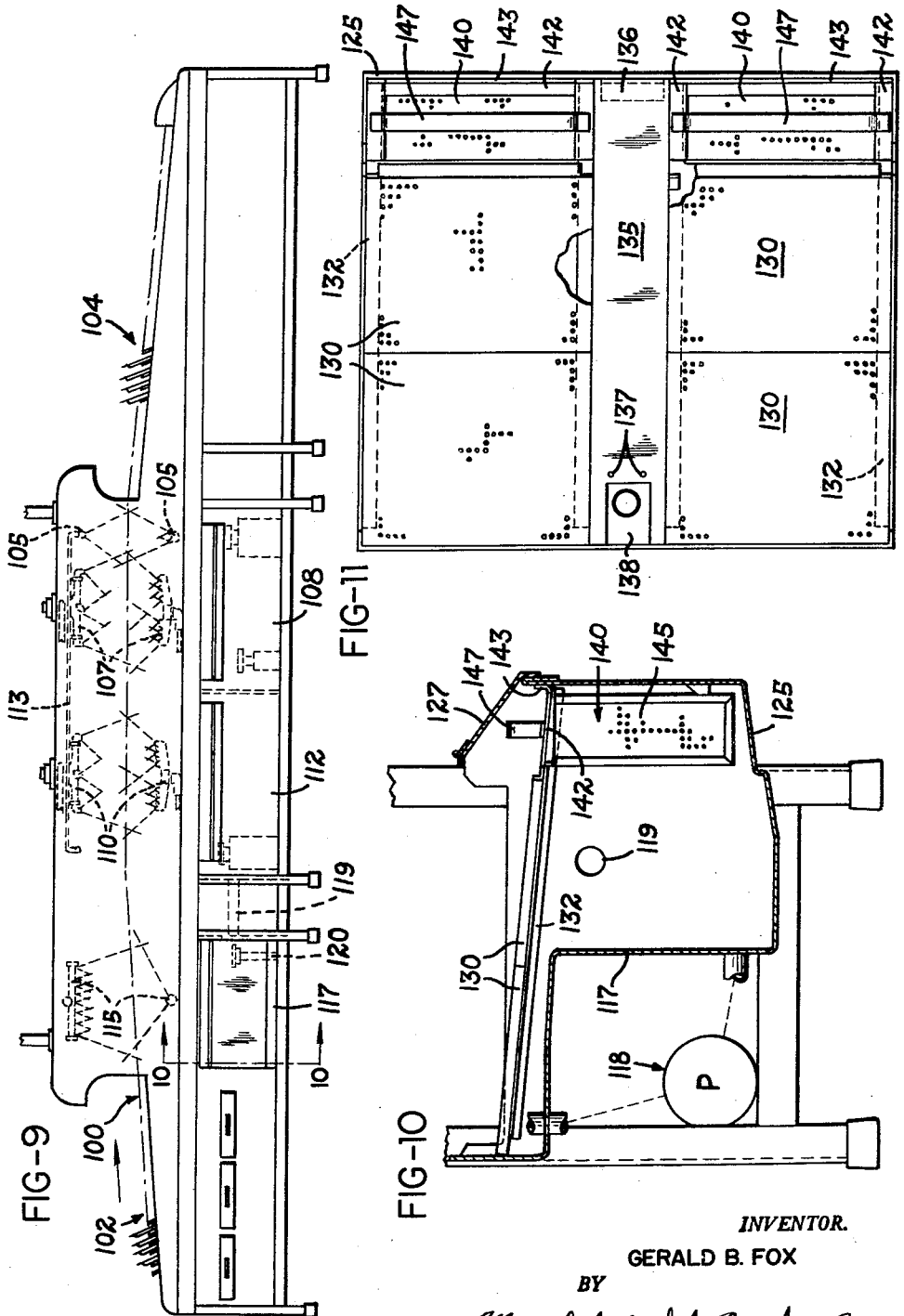
INVENTOR.
GERALD B. FOX
BY
Marechal, Biebel, French & Bugg
ATTORNEYS

United States Patent Office 3,067,757
Patented Dec. 11, 1962

3,067,757
POWER SCRAPPER FOR DISHWASHING MACHINES
Gerald B. Fox, Troy, Ohio, assignor to The Hobart Manufacturing Company, Troy, Ohio, a corporation of Ohio
Filed Apr. 26, 1961, Ser. No. 105,688
4 Claims. (Cl. 134—111)

This invention relates to power scrappers for dishwashing machines, and particularly to a novel strainer system for such scrappers whereby large waste particles are collected away from the main strainer system pans of the scrapper and sufficient capacity is provided to permit collection of a relatively great quantity of such particles and nonsoluble waste.

In dishwashing machines, particularly such machines of the high capacity commercial type involving at least one washing chamber and a rinsing chamber through which dishes and like articles are passed for cleansing and sanitizing, it is often desirable to provide a so-called power scrapping unit at the entrance to the machine. Such units include one or more spray heads, usually both above and below the path along which the soiled dishes travel, and there is a tank below the scraper chamber from which liquid is recirculated by a pump through the spray heads, thus sluicing or washing larger waste particles and roughage from the soiled dishes prior to entry of such dishes into the main washing chamber of the machine. In the scrapper chamber, below the spray heads and above the normal liquid level of the scraper tank, there are strainer devices for separating larger, and in many cases insoluble, waste particles from the liquid falling back into the tank. In normal operations of such machines these strainers are removed periodically, for example at the end of busy periods in a restaurant, or at the end of the day, and collected waste is cleaned from the strainers.

It has been discovered that in such installations, particularly where a large capacity unit is employed and peak periods of operation may be extensive, as for example in large cafeterias, the operators of the machine often fail to scrap the dirty dishes properly (or some times at all) prior to loading them into the machine, or into racks which carry them through the machine. Particularly, relatively large pieces of insoluble waste such as chunks of vegetable or fruit, small meat bones, wadded paper napkins, and the like, often are left on the dirty dishes, or are permitted to fall into the racks, where racks are used, and such waste will be removed effectively by the power scrapper sprays, and will then of course be collected in the strainers.

The strainer systems are completely effective and adequate in normal operation, but when the machines are operated in this abnormal fashion, it is possible to achieve a large collection of insoluble waste on the strainer in a rather short period of time during peak operating times, and the strainers can become clogged, and should be cleaned of such collected waste before a condition occurs which might impede the flow in the recirculating scrapper system. It is thus desirable to maintain the scrapper recirculation capacity as near maximum as possible while affording a system for collecting the large insoluble waste particles away from the scrapper strainer system.

Accordingly, the present invention provides a novel strainer system for the power scrapers of dishwashing machines wherein waste particles too large to pass through the scrapper strainer system are collected in such a way as to maintain an effective flow of liquid for the recirculating flow of the scrapper.

Another object of this invention is to provide such a novel power scraper construction wherein the screens which separate solids from the scrapping liquid as such solids are washed from soiled dishes and the like, are effectively sluiced of collected waste particles by the recirculating liquid, and the particles are collected in relatively large capacity baskets out of the direct flow path of the scraper recirculation system.

Another object of the invention is to provide such a power scrapper system wherein the waste collection baskets are removable for disposing of the waste collected therein, and wherein such baskets are of relatively large capacity normally mounted immersed in the liquid within the scraper tank such that waste particles capable of floating, or suspension without solution, will be suspended within the baskets, thus minimizing the impedance to flow back into the tank of the sluicing liquid entering the baskets.

Other objects and advantages of the invention will be apparent from the following description, the accompanying drawings and the appended claims.

In the drawings—

FIG. 1 is a side elevational view of a typical dishwashing machine embodying a power scrapper to which the present invention is directed;

FIG. 2 is a horizontal section, taken along line 2—2 of FIG. 1 on an enlarged scale, showing details of the novel scrapper strainer and waste collection system;

FIG. 3 is a side view on an enlarged scale, with some parts broken away and shown in section, showing details of the system;

FIG. 4 is a sectional view on a somewhat larger scale taken along line 4—4 in FIG. 3;

FIG. 5 is a perspective view showing details of one of the strainer pans;

FIG. 6 is a perspective view showing details of one of the waste collection and strainer baskets;

FIGS. 7 and 8 are partial views similar to FIGS. 2 and 3, showing a modification of the invention;

FIG. 9 is a somewhat schematic side elevational view of another type of dishwashing machine to which the present invention can be applied;

FIG. 10 is a sectional view on an enlarged scale taken on line 10—10 of FIG. 9; and FIG. 11 is an enlarged plan view of the scrapper, strainer and waste collection system shown in FIG. 10.

Referring to the drawings, which illustrate preferred embodiments of the invention, FIG. 1 shows the general arrangement of one type of dishwashing machine incorporating the present invention. The main portion of the machine includes a washing chamber 10 including a wash liquid tank 12 therebeneath, and upper and lower spray devices 13 and 14, respectively, through which liquid in tank 12 is recirculated to spray over soiled articles passed through chamber 10. Beyond this chamber, to the left as viewed in FIG. 1, is a power rinse chamber 15 situated over a further tank 17, and including upper and lower spray devices 18 and 19 through which the rinsing liquid is recirculated and sprayed over the articles. Adjacent the exit of the machine there is a final or fresh water rinse spray in the form of upper and lower spray heads 20 and 21. Details of this portion of the machine, including the arrangement of motor driven pumps for the various spray means and separator curtains or the like for defining the internal partitions between the various compartments, are disclosed in Patent No. 2,229,663 to Meeker et al., issued January 28, 1941, to the assignee of this application. Suitable power driven conveyor mechanisms are also provided, and are indicated in FIGS. 1 and 3 by the general reference numeral 25. Details of suitable such conveyor mechanisms are disclosed in said aforementioned patent, and also in the patent to Johnston et al. 2,073,521, issued March 9, 1937, to the same assignee.

The direction of operation of the conveyor mechanism, and thus the machine, is indicated by arrow 27 in FIG. 1. Situated at the inlet to the washing chamber 10, and preferably constructed as an integral extension of the machine, there is a power scrapper apparatus in the form of wall means which define a scrapper chamber 30. The conveyor mechanism 25 extends through this chamber, as shown in FIG. 3 particularly, and a tank 32 is formed beneath the chamber, constituting a part of the scrapper construction, for holding liquid to be sprayed over the soiled articles conveyed through chamber 30 by an upper spray means in the form of a spray head 34 extending somewhat longitudinally of the chamber, and a lower spray head 35. Liquid drawn from tank 32 by motor driven pump 38 (FIG. 4) is supplied to the spray heads 34 and 35, and the racks or other devices containing the soiled articles are passed by the conveyor between the spray heads, with the resultant liquid spray functioning to "scrap" the soiled dishes or other articles, as the operation is known in the art, removing the gross soil from the articles. In some installations it may be desirable to omit the lower spray head 35, thus it should be understood that effective operation of the scrapper can be attained using only the upper spray head.

This soil, which may include large pieces of waste, including insoluble items, such as chunks of vegetable or fruit, pieces of meat or bones, paper napkins, and the like, is washed into the lower portion of chamber 30, and falls into the novel strainer system provided by the invention. At the front of chamber 30, extending over that part which overlies the pump 38 and its drive motor, there is provided a sloped wall 40 (FIGS. 2, 3 and 4) which inclines downwardly toward the walls of tank 32. A baffle plate 41 is mounted on wall 40 as shown. At the exit end of scrapper chamber 30 there is also a cooperating baffle member 42, preferably removable since it overlies one end of tank 32, and preferably including a wall section 43 which slopes toward the entrance end of the scrapper chamber and a second wall section 44 sloping away from the section 43 and toward the inclined bottom wall 40 previously described.

The remainder of the area between the chamber 30 and the tank 32 is enclosed by a strainer device preferably in the form of a plurality of screens or pans 45, preferably perforated, there being three such screens shown in FIGS. 2 and 3. Details of one of these screens are shown in FIG. 5, and thus each screen includes a main plate portion 46 having a plurality of side walls 48 formed as integral depending parts from the main section 46. One such wall includes an extending lower lip 49 adapted to engage under the edge of the adjacent screen member 45, particularly as indicated in FIG. 3. These strainer pans are supported on a pair of inclined brackets or tracks 50 suitably secured to the walls of tank 32 at the top thereof. As shown in FIG. 3, the supporting brackets incline from the baffle member 42 downwardly toward the entrance end of the scrapper chamber, and this inclination may be in the neighborhood of 5° with respect to horizontal. The overflow drain 55 of tank 32 preferably is arranged to maintain a liquid level therein which reaches just beneath the lower edge of the inclined strainer screens 45.

At the entrance end of scrapper chamber 30, formed outside the vertical boundaries of this section for ease of access, and preferably underneath the entrance to the conveyor mechanism such that it is out of the way during operation, there is a waste collection tank 60 which is in effect an extension of tank 32, there being a substantial opening therebetween as shown in FIG. 3, such that liquid flows freely between the main tank and the extension section 60, and the level maintained in the extension section is the same as in the main body of the tank. Within this tank, at or slightly below the normal liquid level therein, there are supporting brackets or angles 62 which extend the full length thereof, and a plurality of strainer and waste collection baskets 65 are supported on these brackets. Details of one of the baskets are shown in FIG. 6, and include an upper rim portion 66 which is of slightly larger dimension than the main screen-like or perforated body portion 67 such that the rim portion 66 can rest upon bracket 62 and hold the main body of the basket suspended in the liquid of the tank extension 60. An elongated handle 68 is attached to the rim member 66, and preferably is of such length, as shown in FIG. 3, that the upper portion of the handle is normally located slightly beneath the upper edge of the extension tank 60, providing for easy grasping and removal of each basket.

The operation of the strainer system is as follows. The sprays of scrapping liquid, as noted above, strip the gross waste from the soiled articles and this waste material is carried with the falling sprayed liquid down through the conveyor mechanism 25 onto the bottom walls of the chamber and onto the strainer pans 45 and baffle 42. The solid portions of the chamber bottom, i.e., wall 40 and the various sections of baffle 42, are inclined such that the pieces of gross soil are sluiced or flushed onto the strainer pans 45, and these pans in turn are so inclined that while some liquid will pass through their perforated sections 47 and return directly to tank 32, a sufficient flow of sluicing or flushing liquid will be maintained over the inclined strainer pans to carry the pieces of waste down into the extension tank 60, where the waste particles and pieces fall into one or more of the baskets 65. Of course, where it is desired to use imperforate or continuous pans, all liquid and waste will flush into the baskets.

In operation, this flow across the strainer pans has been found to be of sufficient volume to carry pieces of waste even into the basket which is farthest from the main tank 32. The baskets are perforated or otherwise provided with openings through a substantial part of their body, as previously noted, and thus liquid entering the baskets can return to the main body of liquid in the tank 32 and its extension 60. On the other hand, since the main body of each basket is submerged, waste particles which can float, or remain somewhat in suspension, will do so and will not tend to clog the perforate portions 67 of the baskets. This tends to minimize clogging of the perforations in the basket to such an extent that a considerable amount of waste material can be collected therein. Of course, heavy and insoluble particles will fall to the bottom of the baskets. Large pieces of soluble waste will also collect therein, and can in time be dissolved in the liquid.

The tank extension 60 occupies space which normally is covered by the supply or delivery table to the dishwashing machine. Portions of such a table are designated by the general reference numeral 70 in FIGS. 2 and 3, and a guide 71 normally is provided for aligning racks carrying the soiled articles with the receiving or inlet end of the conveyor mechanism 25. Thus, the tank extension 60 can be located beneath table 70, and preferably a removable cover plate 72 is provided, normally supported flush with the surface of table 70 by resting upon a plurality of corner brackets or ears 73. The cover 72 can be easily removed, to provide ready access to the long handles 68 of baskets 65, and thus they in turn can be removed from the machine with ease for purposes of dumping the collected waste and cleaning the baskets of any waste products which might collect in the perforated body 67 of the baskets.

With reference to FIGS. 7 and 8, in some instances it may be desirable to provide a "sizing" arrangement which will distribute the particles of waste material among the baskets according to the relative size of the particles. This has not been found to be necessary in most installations, but it may be desirable in a few special cases. For this purpose, a plate 75 is provided extending over the first two baskets 65, counting from the screens 45, and this plate is provided with a series of smaller apertures 76 in the part thereof overlying the first basket, and larger apertures or holes 77 overlying the second or middle basket, while the third basket is uncovered. The plate 75 includes upwardly extending side walls 78 (FIG. 8) which are provided with a hinge pin connection 79 to the wall structure of tank extension 60. The manner in which the plate 75 and its side walls can be pivoted to permit removal of the baskets therebeneath is clearly shown by the dotted lines in FIG. 8. In operation, the large particles will be flushed over the smaller holes 76, and if they are too large to drop through the hole 77 they will proceed to the open end basket, whereas at least some of the smaller particles will fall through the smaller holes 76 into the first basket.

In order to provide ample liquid for scraping purposes, and to assure that such liquid is not permitted to acquire too great a concentration of waste particles in suspension, it is preferable to drain the washing and rinsing liquid from the machine through the scrapper tank 32 during operation, thus affording constant replenishment of the scrapping liquid. The distribution of the water may be generally as follows.

Each time a rack of soiled articles passes beneath the final rinse spray apparatus 20 it will be actuated to spray hot fresh rinse water over the dishes or other articles passing from the machine. This actuation of the final rinse spray is thus intermittent in accordance with the passage of the racks, and suitable mechanism for this purpose is known in the prior art, and is shown for example in said Patent No. 2,073,521. This fresh rinse water falls from the cleansed articles into tank 17, and is added to the liquid therein which is recirculated through the power rinse spray heads 18 and 19. The level in this tank is maintained during operation by an overflow pipe 80 which extends into the scrapper tank 32. Each time the fresh water rinse spray 20 is operated a predetermined quantity of fresh water is supplied through a diverter line (not shown) into the wash tank 12. Suitable arrangements for this purpose also are known in the prior art. The overflow from tank 12, which maintains the liquid level therein, is directed during operation through overflow pipe 82 which also extends into scrapper tank 32. The overflow drain 55 of the scrapper tank is constructed to maintain a level in tank 32 slightly below the level in tanks 17 and 12, and thus all outflow from the machine to the sewer or other drain line is through the scrapper tank 32 and its overflow drain 55. This assures sufficient replenishing in the power scrapper spray system to avoid excessive concentration of waste particles in the liquid used for scrapping.

FIGS. 9, 10 and 11, disclose the adaption of the present invention to dishwashing machines of the continuous open conveyor type, sometimes known in the art as "flight type" machines. A typical construction of such a machine is disclosed in Fox et al. Patent 2,644,473, issued July 7, 1953, to the assignee of this application. Cross reference is made particularly to FIG. 1 of that patent, which it will be noted discloses the same general arrangement as shown in FIG. 9 herein.

Thus, a power driven conveyor 100 operates, usually continuously, when the machine is in use to convey dishes or other soiled articles loaded thereon at the loading station 102 through the various spray means of the machine, and the cleansed articles exit at the unloading station 104 where they must be removed from the conveyor. The spray means are of essentially the same arrangement as previously described in connection with FIG. 1 herein, and include the fresh water final rinse sprays 105, the power rinse sprays 107 through which rinsing liquid is recirculated from a tank 108, and the wash sprays 110 through which washing liquid is recirculated from the wash tank 112. The bypass line 113 from the final or fresh water sprays 105 is directed into the washing chamber above tank 112, and supplies makeup liquid thereto, in the manner generally discussed above.

The power scrapper spray heads are shown at 115, and scrapping liquid is recirculated through them from tank 117 by means of a power driven pump 118 (FIG. 10). The overflow arrangement for maintaining a certain amount of makeup liquid to scrapper tank 117 can be the same as previously described, or makeup liquid for this purpose can be obtained merely from the wash tank 112 through the overflow tube 119. The overflow drain from the scrapper tank is shown schematically at 120.

The scrapper tank 117 is provided with an extension section 125 in the same nature as the previously discussed tank extension 60. Here, however, the extension tank 125 projects to one side of the machine beneath the clean-out and inspection door 127. Thus, the tank extension 125 occupies only space beneath this door which is already available on machines of this type.

The scrapper strainer and waste collection system is provided in the form of a plurality of strainer pans 130 (preferably perforated) resting in their operative position on a plurality of supporting side tracks 132 and a central divider rail 135 which is in turn supported at its outer end by a bracket 136. The inner end of rail 135 is received over a pair of locater pins 137 on the fitting 138 through which liquid is pumped from the pump 118 to the upper scrapper spray head 115. It should be noted that this fitting is not shown in FIG. 10, in order to clarify the illustration of the strainer system.

In the tank extension 125 there is a pair of waste collection baskets 140 and these baskets include an upper rim construction 142 including a deflector portion 143 (FIG. 10) which diverts waste particles into the main perforated body 145 of the baskets 140. Handles 147 are provided for each basket to facilitate removal thereof. The operation of the strainer and waste collection system shown in FIGS. 10 and 11 is exactly the same as the system previously described, and it will be noted that the screens or pans 130 are mounted in an inclined position such that gross soil and particles falling thereon are effectively flushed into the collection baskets 145. It will also be noted that the level maintained within tank 117 and its extension part 125 is sufficient to submerge a major portion of the collection baskets 145 during normal operation, thus maintaining the same mode of operation as previously described.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. In a dishwashing machine having a scrapper including a chamber through which soiled articles are passed on entry to the machine to remove gross soil therefrom, said scrapper also including a tank for scrapping liquid, a spray device for flowing such liquid over the articles to flush the gross soil therefrom and a means for circulating the liquid from the tank through the spray device, the combination of an entrance table next to said chamber forming a support for racks of soiled articles entering said chamber, an extension tank beneath said table having free flow communication with said scrapper tank to maintain the same liquid level in said tanks, at least one soil particle collecting basket having an open top and relatively small openings in the body thereof for flow of liquid between said basket and said tank while retaining particles in said basket, means mounting said basket in said extension tank with said open top above the liquid level and said body of said basket substantially immersed, means forming an access opening through said table providing for withdrawing said basket to discharge collected soiled particles therefrom, a strainer system in said scrapper tank covering the top thereof above the liquid level and including at least one strainer screen functioning to separate soil particles from the liquid falling into said scrapper tank from said spray device, and means mounting said screen in an inclined position sloping downwardly to adjacent said open top of said basket providing for flushing of particles collected on said screen into said basket, the particles being retained in said basket wherein such particles can float and providing for recirculation of the liquid used for such flushing into said scrapper tank.

2. In a dishwashing machine having a scrapper including a chamber through which soiled articles are passed on entry to the machine to remove gross soil therefrom, said scrapper also including a tank for scrapping liquid, a spray device for flowing such liquid over the articles to flush the gross soil therefrom and a means for circulating the liquid from the tank through the spray device, the combination of an entrance table next to said chamber forming a support for racks of soiled articles entering said chamber, an extension tank beneath said table having free flow communication with said scrapper tank to maintain the same liquid level in said tanks, a plurality of soil particle collecting baskets each having an open top and relatively small openings in the body thereof for flow of liquid between said baskets and said tank while retaining particles in said baskets, means mounting said baskets in said extension tank arranged serially away from said scrapper tank and with said open tops above the liquid level and said bodies of said baskets substantially immersed, means forming an access opening through said table providing for withdrawing said baskets to discharge collected soiled particles therefrom, a strainer system in said scrapper tank covering the top thereof above the liquid level and including at least one strainer screen functioning to separate soil particles from the liquid falling into said scrapper tank from said spray device, means mounting said screen in an inclined position sloping downwardly to adjacent said open top of said basket providing for flushing of particles collected on said screen into said basket, and a distributor plate extending over at least one of said baskets forming a continuation of said screen, said plate having substantially larger holes therein than said screen and operating to distribute particles graded in size among said baskets.

3. In a dishwashing machine having a scrapper including a chamber through which soiled articles are passed on entry to the machine to remove gross soil therefrom, said scrapper also including a tank for scrapping liquid, a spray device for flowing such liquid over the articles to flush the gross soil therefrom and a means for circulating the liquid from the tank through the spray device, and a conveyor mechanism for carrying the soiled articles through said chamber over said scrapper tank, the improvement comprising an extension tank projecting from said scrapper tank to the exterior of the machine and having free flow communication with said scrapper tank for interchange of the scrapping liquid therebetween, at least one soil particle collecting basket having an open top and relatively small openings in the body thereof for flow of liquid to and from said basket and said extension tank while retaining particles in said basket, means mounting said basket in said extension tank with said open top above the liquid level and said body of said basket substantially immersed, means providing for access to said extension tank from the exterior of said machine for withdrawing said basket to clean collected soil particles therefrom, a strainer device in said scrapper tank covering the top thereof above the liquid level and including at least one strainer screen functioning to separate soil particles from the liquid falling into said scrapper tank from said spray device, and means mounting said screen in an inclined position sloping downwardly to adjacent said open top of said basket providing for flushing of particles collected on said screen into said basket, the liquid flow over said screen and into said basket for flushing purposes being returned through said extension tank into said scrapper tank and the particles flushed into said basket being retained therein and capable of remaining in suspension within said basket to minimize clogging of said small openings in the body of said basket.

4. Apparatus as defined in claim 3 wherein said extension tank projects laterally from the machine to one side of said scrapper tank, and clean-out doors are provided over said extension tank for withdrawing of said basket.

References Cited in the file of this patent

UNITED STATES PATENTS

| | | |
|---|---|---|
| 1,508,828 | Wholey | Sept. 16, 1924 |
| 1,605,961 | Loeuu | Nov. 9, 1926 |
| 1,661,356 | Baker | Mar. 6, 1928 |
| 2,175,677 | Zademach | Oct. 10, 1939 |
| 2,196,804 | Ball | Apr. 9, 1940 |
| 2,598,074 | Sadwith | May 27, 1952 |
| 2,949,120 | Federighi et al. | Aug. 16, 1960 |

UNITED STATES PATENT OFFICE

CERTIFICATE OF CORRECTION

Patent No. 3,067,757 December 11, 1962

Gerald B. Fox

It is hereby certified that error appears in the above numbered patent requiring correction and that the said Letters Patent should read as corrected below.

In the drawings, Sheet 1, the uppermost dash line indicating the level of liquid in FIG. 3 is incorrect and inconsistent with the specification. The correct normal liquid level is indicated by the dash line which is second from uppermost in FIG. 3.

Signed and sealed this 20th day of August 1963.

(SEAL)
Attest:

ERNEST W. SWIDER
Attesting Officer

DAVID L. LADD
Commissioner of Patent